United States Patent Office 3,164,461
Patented Jan. 5, 1965

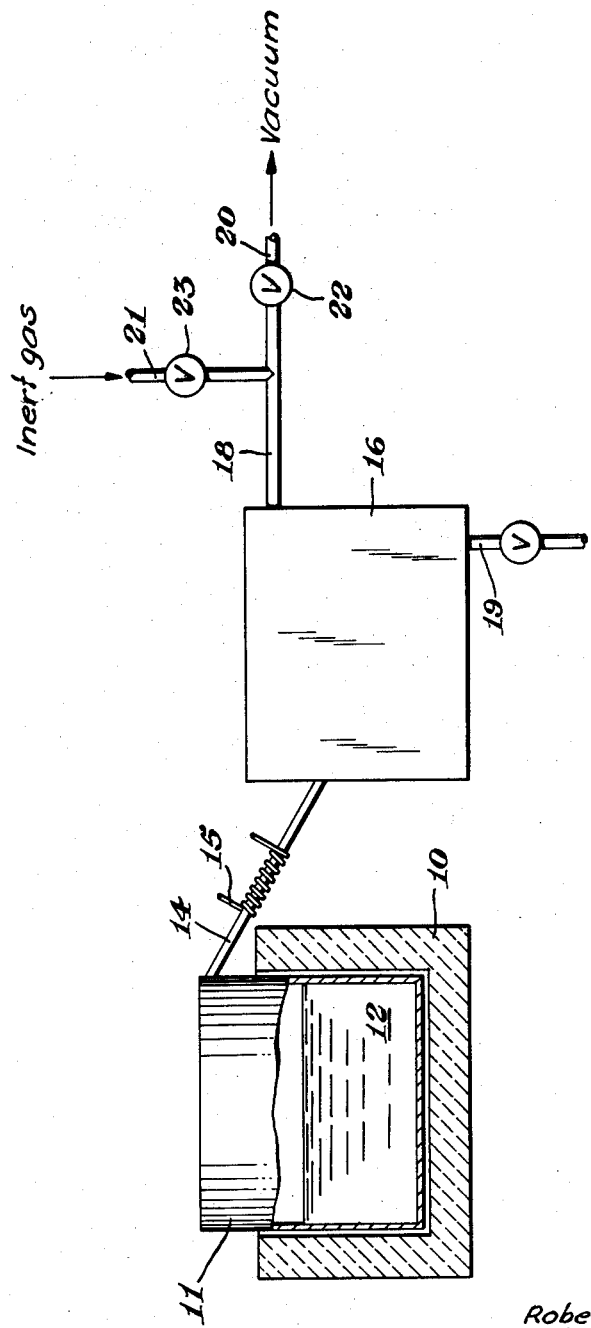

3,164,461
PRODUCTION OF HIGH PURITY CESIUM
Robert J. Moolenaar, Robert S. Karpiuk, and Marshall P. Neipert, Midland, Mich., assignors to The Dow Chemical Company, Midland, Mich., a corporation of Delaware
Filed Jan. 15, 1962, Ser. No. 166,336
3 Claims. (Cl. 75—66)

The method of the present invention relates to the production of cesium and more particularly relates to the method for the production of cesium in high purity from the simple halides. Heretofore, cesium metal has been prepared by methods which are not attractive on an industrial scale due either to high raw material costs or to the use of high cost process steps.

This application is a continuation-in-part of our co-pending application U.S. Serial No. 19,612, filed April 4, 1960, now abandoned.

Cesium has been prepared from its compounds by reduction of the compound with calcium carbide, zirconium, aluminum, or an alkaline earth metal, but both high yields and good purity have not been consistently obtainable by any of these processes on an economical basis.

In one of the above methods (disclosed in British Patent 590,274) it was suggested that an alkali metal other than lithium could be produced by the reduction of one of its salts by another alkali metal having a higher boiling point. Specifically, the above patent dealt with the production of potassium from potassium chloride by reduction with sodium metal. Other salts and metals are suggested but not illustrated. The results of the process, as set forth in the example of the patent, indicated that a considerable contamination of product metal by reductant metal occurred.

A principal object of the present invention is to provide a novel and economical method and apparatus for the preparation of cesium metal in high purity and good yield.

Another object of the present invention is to provide a process of preparing cesium metal which is simpler to perform and less costly than previously known methods.

It has now been discovered that if a reaction mixture of lithium and an appropriate halide salt of cesium is heated to an elevated temperature, vapors of the cesium may be readily collected and condensed to obtain the desired cesium metal in good yield and high purity.

In the schematic drawing, a cut-away illustration of one type of appropriate apparatus for conducting the process of the present invention is presented. A furnace 10 is provided and an appropriate reaction vessel 11 positioned in the furnace. A bath 12 of a molten mixture of cesium halide and lithium is positioned within said vessel 11. The vessel is provided with an outlet 14 which acts as a side arm condenser. Said condenser 14 may be cooled, if desired, as by a water coil 15. Said condenser 14 empties into a receiving vessel 16. Receiving vessel 16 is provided, additionally, with a gas outlet 18 and a suitably controlled outlet 19 for cesium metal.

Gas outlet 18 is connected, as by means of a T arrangement to a vacuum line 20 and, optionally, a source of inert gas 21. The vacuum line 20 and the inert gas source line 21 are valved with valves 22 and 23. It is to be understood that the system be constructed in such a manner as to be evacuable.

In preparing cesium metal according to the method of the invention cesium chloride and cesium bromide are the appropriate halide salts. To avoid contamination of the cesium metal product it is desirable to employ reactants which are free not only of impurities such as moisture, which would volatilize at the reaction temperature, but also of impurities such as mercury salts, which would react with the reductant metal to form a volatile material.

The proportions of lithium employed may be varied from one equivalent of lithium per equivalent weight of cesium halide to as high as 9 or more equivalent weights of lithium per equivalent weight of cesium halide. Very good yields of cesium metal, based on the amount of halide used, are obtained using about 1.5 equivalent weights of lithium per equivalent weight of cesium halide.

In carrying out the method of the invention for the preparation of cesium, using the apparatus shown in the drawing, a charge, or reaction mixture, of cesium halide and lithium is placed in the reaction vessel 11. Then the apparatus and the charge are dried and freed of oxygen as by evacuating the apparatus. Optionally, the apparatus may be evacuated several times through valve 22 and filled with an inert gas, such as argon, through valve 23, after each pumping down. Finally, the system is evacuated, preferably to a pressure below about ten millimeters of mercury absolute.

The charge is then heated slowly as by means of a furnace 10 placed around the lower portion of the reaction vessel 11. Optionally, cooling water may be admitted to the cooling coils 15. In the temperature range of 350 to 750° C., depending on the pressure in the system, cesium distills across to the receiver 16. If desired, forerun may be bled from the receiver.

Temperatures to be employed in the process of the present invention range from about 350 to about 800 degrees centigrade, preferably from about 550 to about 750 degrees centigrade. Factors dictating the specific choice of temperature include the melting point of the salt mixture, the pressure employed, the degree of purity desired in the product and the desired efficiency of the reaction. Usually, during the course of the reaction, a temperature range will be employed, the reaction initially being at a lower temperature and proceeding to higher temperatures as product distills from the reaction mixture.

Carrying out the reaction under reduced pressure conditions facilitates rapid distillation of the product metal at a relatively low temperature. Higher pressures retard distillation and the combination of higher temperatures and longer times are required to substantially complete the reaction.

In any event, it is essential, in obtaining a high purity cesium metal free from oxides, that oxygen and moisture are substantially entirely removed and excluded from the reaction apparatus. This is accomplished by reacting dry reactants in a vacuum tight apparatus which has been evacuated to a pressure below about 10 millimeters of Hg.

It has unexpectedly been found that the reaction of the present invention produces a cesium product containing less than 10 parts per million of lithium, the only impurities present, except oxygen, being those present in the salt reactant. Thus, the purity of the product is dependent on the purity of the starting materials, the reaction product being free of reactants. As well as high purity product, excellent yields are obtained by use of the process of the present invention.

In another embodiment of the invention the reaction mixture consisting of a cesium halide, lithium and a melting point depressant for the reaction mixture is employed in obtaining an extremely pure product. Suitable materials employed to depress the melting point of the cesium halide at the start of the reaction and facilitate contact between the cesium halide and the lithium metal, are inert halides such as halides of lithium. The use of the melting point depressant also helps to reduce mechanical carry-over of lithium into the side arm condenser.

The following example is set forth to further illustrate, but is not to be construed to limit, this invention.

EXAMPLE

A series of experiments were carried out to demonstrate the process of the invention. Apparatus of the type shown in the drawing and described hereinabove was provided with an electric tube furnace adapted to heat the lower half of the reaction vessel. The reaction vessel was dried by heating it under vacuum and atmospheric oxygen was purged from the apparatus as it cooled. A gentle flow of argon through the apparatus was maintained while a reaction mixture consisting of an alkali metal other than cesium and a cesium halide, with or without a melting point depressant, was placed in the reaction vessel. The vessel was sealed and evacuated. A reduced pressure below about 10 mm. of Hg was maintained in most runs. Water was circulated through the cooling coils of the side arm condenser. Then the tube furnace was turned on and the temperature of the reaction mixture was brought slowly to a temperature in excess of about 350° C. so that cesium metal formed in the reaction mixture distilled across. The distilled metal was collected in an all glass receiver. The distilled metal was then removed from the receiver.

The results of the experiments, the reaction conditions and the reactants employed are listed in the table.

*Table*

| No. | Reactants | | Added Salt | Mole Ratio, Reductant Metal Cesium Salt | Range of Pressure, mm. Hg | Temp. Range, °C. | Distilled Product | |
|---|---|---|---|---|---|---|---|---|
| | | | | | | | Yield, Percent | Purity, Percent |
| 1 | Li | CsCl | -------- | 1:1 | 0.005–0.03 | 410–610 | 77 | 99+ |
| 2 | Li | CsCl | -------- | 1.5:1 | 0.005–0.07 | 250–650 | 95 | 99+ |
| 3 | Li | CsBr | -------- | 1.5:1 | 0.003–0.06 | 420–700 | 84 | 99+ |
| 4 | Li | CsBr | -------- | 1.6:1 | 0.02–0.05 | 400–650 | 76 | 99+ |
| 5 | Li | CsBr | -------- | 2.3:1 | 0.002–0.01 | 375–455 | 74 | 99+ |
| 6 | Li | CsCl | LiCl | 9:1 | 0.01 | 500–750 | 54 | 99+ |
| 7 | Li | CsCl | -------- | 1.5:1 | 760 | 675–760 | ca. 50 | |
| 8[1] | Na | CsCl | LiCl | 1.4:1 | 9–13 | 620–800 | 27 | 91 |
| 9[1] | Na | CsCl | LiCl | 1.4:1 | 0.006–0.02 | 375–410 | 45 | 95 |
| 10[1] | Na | CsCl | LiCl | 1.6:1 | 0.01–0.02 | 375–600 | 42 | 94 |

[1] Examples 8, 9 and 10 are set forth as comparisons to show the generally lower yield and purity obtained when sodium is used as the reductant metal.

Among the advantages of the process of the invention are the operability of the process at low temperatures under reduced pressures whereby requirements for materials of constructions of the apparatus are made less severe.

Various modifications may be made in the present invention without departing from the scope or spirit thereof, and it is to be understood that we limit ourselves only as defined in the appended claims.

We claim:

1. A method for the production of cesium having a purity of at least 99 percent, consisting essentially of heating to a temperature of from about 350 to about 800 degrees centigrade at an absolute pressure below about ten millimeters of mercury, a dry reaction mixture comprising a halide of cesium selected from the group consisting of cesium chloride and cesium bromide, together with lithium, whereby said halide is reduced to the free cesium metal, and recovering the so-formed cesium metal from the reaction mixture by distillation.

2. A method for the production of cesium having a purity of at least 99 percent and containing a maximum of 10 parts per million of reductant metal, consisting essentially of heating to a temperature of from about 350 to about 800 degree centigrade at an absolute pressure below about ten millimeters of mercury, a dry reaction mixture comprising a halide of cesium selected from the group consisting of cesium chloride and cesium bromide, together with lithium, whereby said halide is reduced to the free cesium metal, and recovering the so-formed cesium metal from the reaction mixture by distillation.

3. A method for the production of cesium having a purity of at least 99 percent, consisting essentially of heating to a temperature of from about 550 to about 750 degrees centigrade at an absolute pressure below about ten millimeters of mercury, a dry reaction mixture comprising a halide of cesium selected from the group consisting of cesium chloride and cesium bromide, together with lithium, whereby said halide is reduced to the free cesium metal, and recovering the so-formed cesium metal from the reaction mixture by distillation.

References Cited in the file of this patent

UNITED STATES PATENTS

| | | |
|---|---|---|
| 709,489 | Jaubert | Sept. 23, 1902 |
| 1,707,637 | Miesse | Apr. 2, 1929 |
| 1,797,131 | De Boer | Mar. 17, 1931 |
| 1,818,881 | Busch | Aug. 11, 1931 |
| 2,480,655 | Jackson | Aug. 30, 1949 |
| 2,548,876 | De John | Apr. 17, 1951 |
| 2,880,987 | Hnilicka | Apr. 7, 1959 |
| 2,950,962 | Carlson | Aug. 30, 1960 |

FOREIGN PATENTS

| | | |
|---|---|---|
| 590,274 | Great Britain | July 14, 1947 |